United States Patent [19]

Gibson

[11] Patent Number: 5,000,111

[45] Date of Patent: Mar. 19, 1991

[54] TRAIL MARKING DEVICE

[76] Inventor: Robert L. Gibson, 5471 Homestead La., Bay City, Mich. 48706

[21] Appl. No.: 443,505

[22] Filed: Nov. 30, 1989

[51] Int. Cl.[5] .......... G01D 21/00

[52] U.S. Cl. .......... 116/209; 40/299; 256/4

[58] Field of Search .......... 116/209, DIG. 14, 22 A; 40/514, 299, 300; 256/4

[56] References Cited

U.S. PATENT DOCUMENTS

| | | | |
|---|---|---|---|
| 2,079,742 | 5/1937 | Kocher | 40/25 |
| 2,112,627 | 3/1938 | Kohnle | 40/25 |
| 2,341,583 | 2/1944 | Tuve | 206/59 |
| 2,430,534 | 11/1947 | Rodli | 116/DIG. 14 X |
| 3,276,416 | 10/1966 | Dirks et al. | 116/28 |
| 3,411,978 | 11/1968 | Frohbach et al. | 161/145 |
| 3,499,416 | 3/1970 | Thorsheim | 116/114 |
| 3,568,626 | 3/1971 | Southworth, Jr. | 116/209 |
| 3,685,482 | 8/1972 | Ryder | 116/209 |
| 3,785,337 | 1/1974 | Flowerday | 116/114 |
| 4,070,911 | 1/1978 | Makin | 73/343 |
| 4,170,127 | 10/1979 | Butera | 116/DIG. 14 |
| 4,401,050 | 8/1983 | Britt et al. | 116/DIG. 14 X |
| 4,601,538 | 7/1986 | Valkenburg | 350/98 |
| 4,742,796 | 5/1988 | Halsey | 116/209 |
| 4,849,043 | 7/1989 | Instance | 40/299 X |
| 4,882,861 | 11/1981 | Holmes et al. | 40/299 X |

*Primary Examiner*—Daniel M. Yasich
*Attorney, Agent, or Firm*—John J. Swartz

[57] ABSTRACT

A trail marking device for marking a trail and guide an individual who is retracing his steps in a wooded area during daylight or darkness. The trail marking device includes an elongate sheet of light reflecting material which can be easily seen in the daylight and an abutting strip of luminescent material which can be more easily viewed in darkness. A plurality of longitudinally spaced, longitudinally aligned wire sections are sandwiched between the strips for securing individual sheet sections to a tree limb. The sheet sections are detachably coupled to adjacent sheet sections along perforated break lines. The strips are wound on a spool which include a plurality of tacks which can be used for alternately tacking the strips to a tree.

24 Claims, 1 Drawing Sheet

TRAIL MARKING DEVICE

BACKGROUND OF THE INVENTION

1. Field of the Invention

This invention relates to a trail marking device and more particularly to a device for marking a trail to guide a person, in either daylight or darkness, retracing his path through a wooded area.

2. DESCRIPTION OF THE PRIOR ART

Individuals who walk in an unfamiliar wooded area have heretofore typically marked their trail by breaking branches, or chopping or otherwise removing pieces of selected trees along the trail. Such techniques, although valuable, are sometimes ineffective because the marks are not easily found. The broken limbs or chopped bark tends to blend into the surroundings and are not immediately noticeable. Accordingly, it is an object of the present invention to provide a new and novel trail marking device which will guide an individual retracing his path through a wooded area.

It is another object of the present invention to provide a new and novel trail marking device which can be easily visualized.

It frequently occurs that a person will sometimes enter a wooded area during daylight and retrace his trail in darkness. The chopped trees and bark are not readily visible in darkness. Accordingly, it is another object of the present invention to provide a new and novel trail marking device which can be more easily found in either daylight or darkness.

It has been found that marking a trail with a strip of hunter orange or blaze orange material, which is more easily seen than material of other colors, is particularly advantageous for a trail maker traveling in the daylight hours.

In darkness, however, the blaze orange material is not easily viewed and thus it has been found that luminescent and/or phosphorescent material enhances the ease with which a trail maker can find a mark. Accordingly, it is an object of the present invention to provide a trail marking device which includes at least one portion of highly reflective material which is easily viewed in daylight and a luminescent strip which can be easily viewed in darkness.

Although one could tie or tack such a trail marker to a tree limb, it has been found, according to the present invention, to be particularly advantageous to utilize a wire which is embedded between the strips. Otherwise, the trail marker, if tied to a tree limb, become more easily untied, separated from the tree and lost. Accordingly, it is an object of the present invention to provide a trail marking device of the type described which includes a wire embedded therein for tying the trail marker to a tree limb or the like.

It has also been found advantageous that the strip of material be provided with a plurality of tear lines, such as perforations, and that the wire be interrupted along its length at the tear lines to provide individual marker sections which are coupled together but which can be separated from each other along the tear lines. Accordingly, it is an object of the present invention to provide trail marking strips of the type described which includes a plurality of interconnected marker sections which are coupled to adjacent marker sections via break lines that are easily severed to allow the individual marker sections to be tied to a tree branch.

It is another object of the present invention to provide a trail marking device of the type described which includes a wire embedded therein that is interrupted at various intervals aligned with the break lines.

It has also been found that sometimes the tree limbs are too large to wrap and thus a container for tacks is provided for tacking the strips to a tree trunk or the like. The tack container also functions as a spool on which the strip is wound. Accordingly, it is an object of the present invention to provide a trail marking device of the type described including a strip wound on a hollow spool which contains tacks for tacking individual portions of the strip to a tree.

Other objects and advantages of the present invention will become apparent to those of ordinary skill in the art as the description thereof proceeds.

SUMMARY OF THE INVENTION

A trail marking device comprising an elongate strip of material having at least one strip portion of light reflecting material which can be easily viewed in daylight, another strip portion of luminescent material for easy visibility in darkness, and an elongate pliable tying member embedded in the elongate strip of material.

BRIEF DESCRIPTION OF THE DRAWINGS

The invention may be more readily understood by referring to the accompanying drawings, in which.

DESCRIPTION OF THE PREFERRED EMBODIMENT

Figure 1:
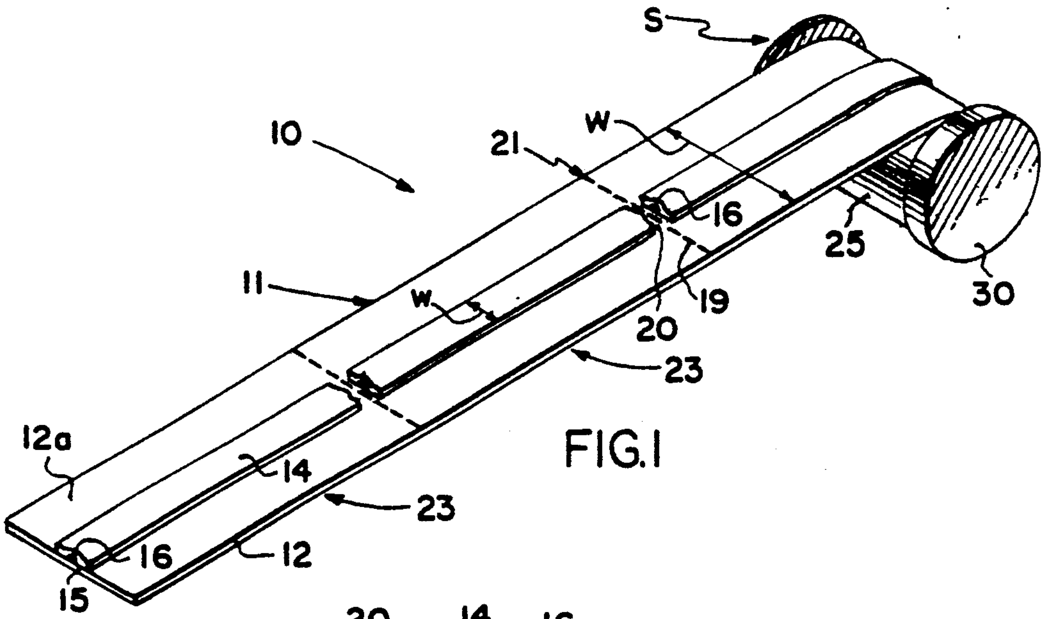
FIG. 1 is a perspective view illustrating the trail marking device constructed according to the present invention.
Figure 2:
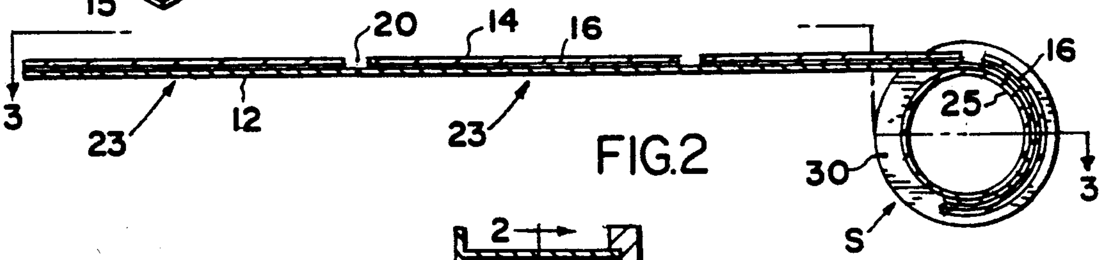
FIG. 2 is a sectional side view thereof, taken along the line 2—2 of FIG. 3.
Figure 3:
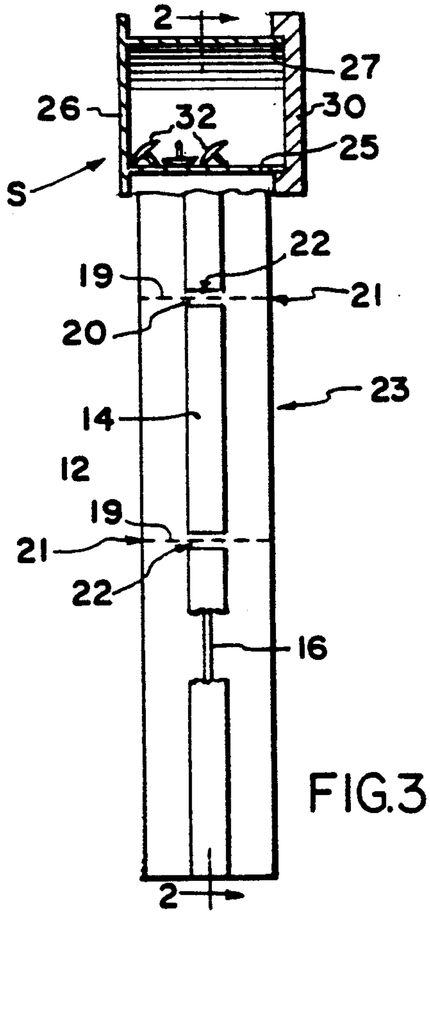
FIG. 3 is a top plan, partially sectional view thereof, taken along the line 3—3 of FIG. 3, part of the tape being broken away to more clearly illustrate the underlying spool.

A trail marking device constructed according to the present invention, generally designated 10, includes an elongated strip, generally designated 11, including a first sheet or strip 12 of pliable, easily wound material of a predetermined width W. The sheet 12 is constructed of material which is of a highly reflective color, such as hunter orange or blaze orange, that is easily viewed in daylight. The strip or sheet 12 may suitably comprise the blaze orange strip material manufactured by The Irwin Company, Wilmington, Ohio, 45127.

The device 10 includes a second strip or tape 14 which is glued or otherwise suitably secured at 15 in abutting relation to one face 12*a* of the strip 12. As can be easily viewed in the drawing, the width w of strip 14 is substantially less than the width W of the strip 12. The tape 14 comprises luminescent material which may suitably comprise phosphorescent beads therein that can be more readily viewed in darkness.

The highly reflective strip 12 includes a plurality of laterally extending, longitudinally spaced apart break lines 21 which span the width of strip 12. Each break line 21 includes a plurality of laterally, adjacent perforations 19. The luminescent strip 14 includes a plurality of longitudinally spaced gaps 20 which are laterally aligned with the perforations 19. The break lines 21 also define the longitudinal boundaries of individual, longitudinally spaced, marker section 23 that can be separated from the adjoining marker sections 23 along the break lines 21 for attachment to a tree limb or the like.

In daylight, the hunter orange material strip 12 will be easily viewed. In darkness, the highly reflective strip 14 can be easily viewed.

A thin, pliable, flexible or easily bendable wire, generally designated 16, is embedded or sandwiched between the strips 12 and 14. The wire 16 is interrupted at longitudinally spaced intervals or gaps 22 coinciding with the gaps 20 and the break lines 21.

The wire 16 is pliable and can be twisted about itself where it will generally remain. In this way, it will be utilized to secure an individual marker section 23 to a tree limb when the marker section is separated along the break line 21.

The trail marking device 10 is wound about a spool, generally designated S, including a hollow cylindrical hub 25 having a closed end 26 and an open end 27. A detachable closure cap 30 is provided for closing the open end 27. The hollow cylindrical hub 25 provides a receptacle for a plurality of tacks, generally designated 32, which can be utilized to tack the individually removed marker sections 23 to a tree limb.

THE OPERATION

In use, a trail maker, such as a hunter, will unwind a portion of the strip 10 from the spool 26. The trail maker will tear the endmost marker section 23 from the adjacent marker section 23 along the joining tear line 21. The trail maker will then tie the individual marker section 23 to a small limb or remove the cover 30 and utilize one of the tacks 32 for tacking the section 23 to a large tree trunk.

The trail marker would leave exposed the side 12*a* which is easily viewed in the daytime and luminescent strips 14 which are more easily viewed in darkness.

Accordingly, the trail marker can easily find the trail markers which will guide his return trail.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. A trail marking device comprising:
an elongate strip of material having
a first elongate strip portion of light reflective material which can be easily seen in daylight, and
a second strip portion of luminescent material for easy visibility in darkness; and
an elongate pliable tying embedded in said strip;
said tying member comprising a plurality of longitudinally aligned longitudinally spaced apart, elongate pliable tie sections, whereby the device can be tied to an object for trail marking purposes.

2. A trail marking device comprising:
an elongate strip of material having
a first elongate strip portion of light reflective material which can be easily seen in daylight, and
a second strip portion of luminescent material for easy visibility in darkness; and
an elongate pliable tying member embedded in said strip;
said elongate strip of material including a plurality of longitudinally spaced perforations to provide a plurality of interconnected marker sections which are attached to, but easily separated from each other, at said perforations for trail marking purposes.

3. The trail marking device set forth in claim 2 wherein said elongate strip portion is of a predetermined width and said second strip portion of luminescent material is of a predetermined lesser width.

4. The trail marking device set forth in claim 2 wherein said tying member includes a plurality of interruptions along the length thereof to provide a plurality of individual tie members.

5. The trail marking device set forth in claim 2 wherein said interruptions are generally aligned with said perforations.

6. The trail marking device set forth in claim 2 wherein said elongate strip of material comprises
a first elongate layer of flexible material, being of said predetermined width; and
said second strip portion comprises a second elongate layer of luminescent material having a lesser predetermined width;
said pliable tying member being sandwiched between said first and second layers.

7. The trail marking device set forth in claim 6 wherein said second elongate layer includes a plurality of longitudinally spaced apart gaps therein; said tying member comprising a wire having a plurality of longitudinally spaced gaps therein aligned with the gaps in said second layer.

8. The trail marking device set forth in claim 6 wherein said surface of light reflective material comprises one lateral face surface of light reflective material and said second layer is secured to said one lateral face of said first layer.

9. The trail marking device set forth in claim 6 wherein said first layer of flexible material comprises material which has a blaze orange color.

10. The apparatus set forth in claim 2 wherein said tying member comprises a plurality of longitudinally aligned elongate pliable tie sections.

11. A trail marking device comprising:
an elongate strip of material having
a first elongate strip portion of light reflective material which can be easily seen in daylight, and
a second strip portion of luminescent material for easy visibility in darkness; and
an elongate pliable tying member embedded in said strip;
said second elongate strip portion including a plurality of longitudinally spaced apart gaps therein;
said tying member comprising a wire having a plurality of longitudinally spaced gaps therein aligned with the gaps in said second strip portion for tying said device to an object for trailing marking purposes.

12. A trail marking device comprising:
a first elongate strip of material, adapted for tying, being of a predetermined width, having inner and outer surfaces;
a second elongate layer of strip of material, adapted for tying, of a lesser predetermined width having inner and outer surfaces;
said first and second layers having at least portions of their inner surfaces abutting each other;
one of said inner surface of said first strip and said outer surface of said second strip being of light reflective material which is easily visible in daylight;

the other of said inner surface of said first strip and said outer surface of said second strip being luminescent for easier visibility in darkness;

elongate, yieldable tying means sandwiched between said layers comprising a plurality of individual, longitudinally aligned tying members, whereby the device can be tied to an object for trail marking purposes.

13. The trail marking device set forth in claim 12 wherein said elongate tying means comprises wire means.

14. The trail marking device set forth in claim 13 wherein said tying means comprises an elongate wire interrupted via gaps at a plurality of longitudinally spaced portions to provide a plurality of wire sections.

15. The trail marking device set forth in claim 14 wherein one of said first and second strips include a plurality of longitudinally spaced break lines which define a plurality of interconnected marker sections that are easily separated from the adjacent marker sections along said break lines.

16. The trail marking device set forth in claim 15 wherein said break lines are longitudinally aligned with said interruptions in said wire means.

17. The trail marking device set forth in claim 15 wherein the other of said first and second layers includes a plurality of gaps which are aligned with said break lines.

18. The trail marking device set forth in claim 15 including a mounting spool comprising a hollow cylindrical hub; said strips of material being coiled about said hub; and a plurality of fasteners disposed in said hub for securing said individual marker sections.

19. A trail marking device comprising:

elongate sheet means including a side having at least one longitudinal strip of highly reflective material which can be easily viewed during daylight and an elongate strip of luminescent material which can be easily viewed in darkness; and elongate flexible tying means secured to said sheet means for securing said sheet means to a tree or the like including a plurality of longitudinally spaced interruptions to provide a plurality of individual, separate pliable tie sections for trail marking purposes.

20. The trail marking device of claim 19 wherein said elongate sheet means includes a strip of highly reflective material and a longitudinal tape secured in abutting relation to said one side of said strip of highly reflective material.

21. The trail marking device set forth in claim 20 wherein the width of said tape is substantially less than the width of said strip.

22. The trail marking device set forth in claim 20 wherein an elongate flexible tying means is sandwiched between said tape and said strip.

23. The trail marking device set forth in claim 22 wherein one of said strip and said tape includes a plurality of longitudinally spaced perforations providing a plurality of longitudinally spaced apart interconnected marker sections which are easily separable from adjacent marker sections along said break lines; said tying means comprising a wire having a plurality of interruptions therein at longitudinal intervals longitudinally coextensive with said break lines.

24. The trail marking device set forth in claim 23 wherein the other of said strip and said tape includes a plurality of longitudinally spaced gaps which are aligned with said break lines.

* * * * *